US006968479B2

(12) United States Patent
Wyatt et al.

(10) Patent No.: US 6,968,479 B2
(45) Date of Patent: Nov. 22, 2005

(54) VERIFYING DATA IN A DATA STORAGE DEVICE

(75) Inventors: Stewart R. Wyatt, Boise, ID (US); Robin Alexis Takasugi, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 556 days.

(21) Appl. No.: 10/092,111

(22) Filed: Mar. 6, 2002

(65) Prior Publication Data

US 2003/0172325 A1 Sep. 11, 2003

(51) Int. Cl.[7] .............................................. G06F 11/00
(52) U.S. Cl. ...................... 714/53; 714/54; 714/768; 714/42; 714/5
(58) Field of Search ............................... 714/53, 54, 5, 714/768, 42

(56) References Cited

U.S. PATENT DOCUMENTS

| | | | | |
|---|---|---|---|---|
| 4,061,908 A | * | 12/1977 | DE Jonge et al. ............ | 714/720 |
| 4,320,466 A | * | 3/1982 | Myers ........................... | 711/217 |
| 5,644,704 A | * | 7/1997 | Pease et al. .................. | 714/42 |
| 6,014,754 A | * | 1/2000 | Yamada ........................ | 714/5 |
| 6,134,677 A | * | 10/2000 | Lindsay ........................ | 714/42 |
| 6,308,297 B1 | * | 10/2001 | Harris .......................... | 714/773 |
| 6,816,986 B1 | * | 11/2004 | Fanning ........................ | 714/42 |
| 6,842,793 B2 | * | 1/2005 | Ohashi et al. ................ | 710/5 |
| 2001/0017806 A1 | * | 8/2001 | Schamberger et al. ...... | 365/202 |
| 2003/0005353 A1 | * | 1/2003 | Mullins et al. ............... | 714/5 |
| 2003/0120985 A1 | * | 6/2003 | Slobodnik et al. ........... | 714/718 |

\* cited by examiner

*Primary Examiner*—Bryce P. Bonzo
*Assistant Examiner*—Christopher McCarthy

(57) ABSTRACT

The present invention relates to a storage device controller for controlling the operations of the data storage system. The controller includes error-correcting code (ECC) coding and decoding of data stored on media of the data storage system. A Verify procedure of the present invention is performed which verifies the validity of the data written to the media. The Verify procedure runs continuously until an error is detected or until an external event terminates the procedure. By accessing a range of memory addresses in the media and by resetting an address counter to a start of the range of addresses after a last address of the range has been accessed, the Verify procedure continuously checks the memory locations for errors. The range of addresses may include all of the accessible addresses in the data storage device. Additionally, information on the quality of the media may be collected and used to determine how much the media deteriorates over time. Sparing of defective memory locations may also be provided, even after manufacturing and packaging of the data storage system.

27 Claims, 4 Drawing Sheets

VERIFYING DATA IN A DATA STORAGE DEVICE

FIELD OF THE INVENTION

The present invention is generally related to data storage and to the recovery of data from a data storage device. More particularly, the invention is related to systems and methods for performing a Verify procedure to determine the ability of data storage devices to recover data.

BACKGROUND OF THE INVENTION

Data storage devices have been used for years to store binary data to be used in computer systems. In data storage devices, there are currently two main types of memory systems being used to store data. Some newer technologies, such as those that use SRAM (Static Random Access Memory), have been developed in an attempt to create a "perfect" memory system, i.e. a memory system in which the storage media is completely reliable. In the perfect memory system, all the data that is stored on the media would be recoverable. In other words, the data can be read off of the media without any errors. The perfect memory system does not require any provision to detect or recover from data corruption in the media.

In a second type of memory system, the memory system has been designed with an imperfect media, such as the magnetic media used in disk drives and tape drives. In this system, the media typically includes imperfections that cause errors in reading data from the media. Therefore, in this type of storage system, it is necessary to somehow accommodate for the errors by detecting and correcting them. Imperfect memory systems are often referred to as memory storage systems.

There is some trade-off between the perfect memory system and the memory storage system. Memory storage systems, using imperfect media, incur the overhead of a controller that implements error detection and correction circuitry. To implement an error detection and correction function, it is normally a requirement that data stored on the media be stored and retrieved as a sector or block (usually 512 bytes). Perfect memory systems do not have the additional cost of an error detection and correction controller. However, in spite of the additional overhead required by imperfect memory systems, the cost to store a given unit of data is dramatically cheaper in memory storage systems with imperfect media than in a perfect memory system.

During the normal evolution of the development of memory storage systems, the quality of the media has improved and the number of errors has been reduced as manufacturers have gained experience. In this environment, it is usually more cost effective to increase the density of the storage in the media such that the error rate remains unchanged.

In the memory storage system, a controller may control how imperfections can be detected and corrected in order to hide the imperfections from a user. The user will be able to safely store data into the storage system while the controller provides reliable retrieval of the stored data. The controller effectively deals with errors in the media such that retrieval of data will appear seamless to the user.

Media errors can be caused by a number of factors, including manufacturing defects, aging, and internal effects such as electrical noise and environmental conditions. In general, defects can be classified as either systematic errors or random errors. Systematic errors consistently affect the same location. Finding systematic errors is relatively easy because they are repeatable, wherein one Verify pass over the media will disclose them.

Random errors occur transiently and are not consistently repeatable. Therefore, random errors are much more difficult to detect because they may not show up in a test involving only one pass of the data.

There are basically two ways that errors in the media can be handled. One way that errors in the media can be handled is by error correction coding and decoding. Error correction coding (ECC) involves receiving original data and encoding the data with additional parity for storing on an imperfect medium. Each sector of data consists of one or more codewords, and, in the example in which the sectors contain 512 bytes, each sector may be divided into four units of 128 bytes. In the preferred implementation, the 128 bytes of original data are encoded with 32 parity bytes to create 160-byte codewords.

When the data needs to be retrieved, the encoded data is decoded allowing errors to be identified and ideally corrected. The data plus the parity is processed through a decoder, which checks the parity to detect errors. The decoder removes the parity bytes, corrects the errors, and returns the original block of data back to the host with the errors removed. The host normally will have no knowledge of the fact that errors have been detected and corrected.

A wide range of ECC schemes is available and can be employed alone or in combination. Suitable ECC schemes may include schemes with single-bit symbols (e.g., Bose-Chaudhuri-Hocquenghem (BCH)) and schemes with multiple-bit symbols (e.g. Reed-Solomon).

As general background information concerning ECC, reference is made to the following publications: W. W. Peterson and E. J. Weldon, Jr., "Error-Correcting Codes," $2^{nd}$ edition, $12^{th}$ printing, 1994, MIT Press, Cambridge, Mass. and "Reed-Solomon Codes and their Applications," Ed. S. B. Wicker and V. K. Bhargava, IEEE Press, New York, 1994.

One implementation uses the Reed-Solomon multi-bit symbol. Correcting a multiple-bit symbol typically includes a two-step process. In the first step the symbol in error is identified. In the second step the error pattern of the symbol is identified so that the errors can be corrected. Errors identified using ECC codes with multiple-bit symbols fall into two categories. The first category is called a "full" error where both steps are required to identify and correct the error. The second category is called an "erasure" error where a symbol in error has been identified by some other means and the ECC code only has to identify the error pattern within the symbol.

Two parity symbols are required to locate and correct a full error while only one symbol is required to correct an erasure error. While not all storage systems implementing an ECC are capable of detecting erasures, the ability to detect and correct erasures can substantially improve the capability of a given coding scheme.

Another way that errors can be handled is to identify errors in particular locations within the media and avoid these locations. This technique is known as sparing. When a defective block of data is identified, the controller will effectively work around the defective areas. When data cannot be stored in a defective location, the controller will find other available space on the media for storing the data. When a later request is made for the data that was intended to be stored in the defective location, the request is diverted to the alternative location for retrieval of the data.

During manufacturing, memory locations with errors can be detected and these locations can be avoided using a sparing technique. When a location is identified as containing an imperfection or if the location appears to be problematic in returning error-free data, this location is put on a list of defective locations known as a spare table. The spare table will include the defective locations so that any request made for data in those locations can be diverted to a specified alternative location where the data was stored.

Once the data is stored on the media, it is essential to a user of the memory product that the stored data is made available to the rest of the computer system, which will utilize the data for performing various functions. For instance, a computer system may use the data for instructions on how to operate a certain program. When the data cannot be read, then the data stored in the storage device typically is useless and the user loses confidence in continuing to use the device.

In order to check whether or not data can be read from a storage device, a Verify command can be used that works in conjunction with a Write command, which involves writing data to the storage media. While executing the Write command, data is encoded and stored on the media along with parity bytes. During the Verify command, the data is read back and decoded to ensure that it can be recovered. After decoding each codeword of data, the decoder reports if it was capable of recovering the data by detecting and correcting any errors in the data. After recovering the decoder status, the decoded data is discarded. If the Verify command determines that data can be read back correctly, then the Write command is considered to have been a success. If data cannot be read back, then the Verify command considers the Write command to have been unsuccessful and necessary measures are taken. This might include a second attempt to write the data or a decision to spare the locations and rewrite the data at a more reliable location. The Verify command may also provide a confirmation that the read/write system is operating properly.

In the typical Verify command, two pieces of information are used for performing the Verify command. First, the control circuit which performs the Verify command is given a "start address" in the media so that the control circuit knows where to look for the first codeword of data to be verified. Then, after verifying the first codeword, the verifying circuitry increments to the next address and performs verification on the data in the next address.

The second piece of information that the typical Verify circuit is given is called a "length parameter" which tells the circuit how long to perform the verification. Or, in other words, the length parameter indicates to the circuit how many addressable locations should be verified.

The conventional Verify command has some limitations in certain test environments. Since the Verify command has a length parameter, the command will stop and interrupt the controller each time it completes testing the specified length. The test stops while the processor responds to the interrupt. Then the processor can resume the test. This wastes processor time and slows down the execution of the test and other functions of the computer system.

The conventional Verify command stops the operation of other computer functions by initiating an interrupt every time the command is run for a specified length of addressable locations. Processing these interrupts wastes processor bandwidth and inevitably slows down other functions even when no errors are discovered during the verification. The processor becomes occupied with the interrupt each time the Verify command is run, thereby slowing down the execution of the test and other functions of the computer system.

Thus, a need exists in the industry to address the aforementioned and/or other deficiencies and inadequacies of the prior art.

SUMMARY OF THE INVENTION

The present invention provides systems and methods for performing a Verify procedure.

Briefly described, one embodiment of the system, among others, can be implemented as follows. One system for verifying data in a data storage device may contain logical circuitry for inputting a starting address into an address counter. The circuitry may then verify the data stored in the address of the data storage device designated by the address to which the address counter points. After verification at that address, the circuitry determines whether or not the address counter points to the last address at the end of the data storage device. If the address counter does not point to the last address, the address counter increments to the next address and verification is performed on the data at that address. If the address counter is pointing to the last address, then the address counter resets to the first address at the beginning of the data storage device.

The present invention can also be viewed as providing methods for verifying data in a data storage device. In this regard, one embodiment of such a method, among others, can be broadly summarized by inputting a starting address into an address counter, verifying whether or not the data stored at the location in the data storage device designated by the address counter contains an error, and determining whether or not the address location in the address counter designates the last address at the end of the data storage device. If the last address has been reached, the method then includes the step of resetting the address counter to the first address at the beginning of the data storage device and repeating the verifying and determining steps. If the last address has not been reached, then the method proceeds by incrementing the address counter and repeating the verifying and determining steps.

BRIEF DESCRIPTION OF THE DRAWINGS

Many aspects of the invention can be better understood with reference to the following drawings. Like reference numerals designate corresponding parts throughout the several views.

DETAILED DESCRIPTION

Verify systems and methods will now be explained in greater detail. A Verify procedure as described herein provides continuous verification of data in a data storage device. Not only is data checked for errors in one pass, as is done in conventional Verify commands, but also the verification is implemented in an infinite loop that may repeatedly access all address locations in a storage media of the data storage device. Since the verification may continue indefinitely, length parameters may be ignored. The Verify procedure described herein may be used in a test environment for verifying the quality of the media during a manufacturing or in-product test. The Verify procedure may also be used for providing an ongoing self-test in a data storage product after manufacturing and packaging of the product. As is discussed herein, the Verify procedure of the present disclosure may be implemented in many ways to provide continuous verification of data stored in the media of a data storage device. Reference is now made to the drawings to describe in detail how the Verify procedure can be implemented.

Figure 1:
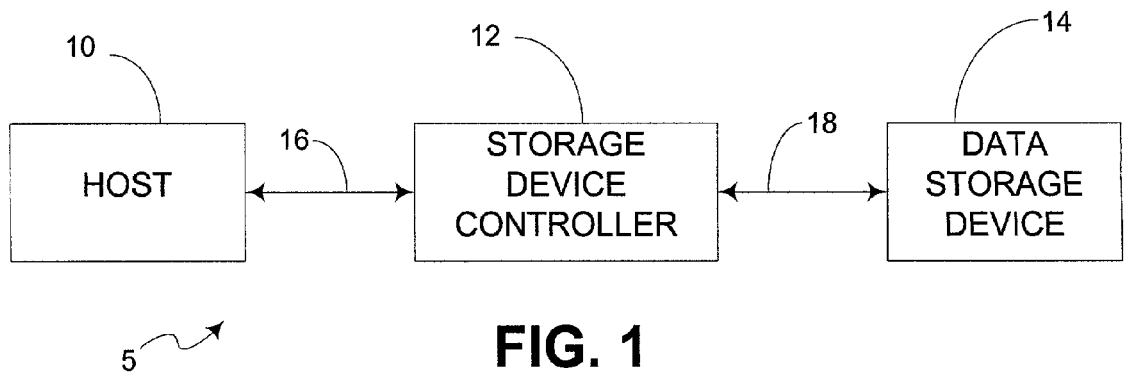
FIG. 1 is a block diagram illustrating an embodiment of a storage system of the present invention.

FIG. 1 illustrates an embodiment of a system 5 that can be used to perform a Verify procedure. As shown in this figure, the system 5 typically includes a host 10, such as a personal computer or other computer system, which relies upon access to memory. Alternatively, the host 10 may be an external testing system used during manufacturing of a storage device or an internal testing system within a storage device that executes self-tests and requests execution of Verify procedures. The host 10 is connected to the storage device controller 12 along line 16 and uses it to interact with a data storage device 14. Line 16 may include any type of serial or parallel path for electrical communication between the host 10 and storage device controller 12.

During operation, the host 10 writes data along line 16 to the storage device controller 12. In addition, the host 10 may read data from the storage device controller 12 when the stored data is requested by the host 10. As is also indicated in FIG. 1, the storage device controller 12 is connected to the data storage device 14 along line 18, which may include any type of serial or parallel communication path. During a Write operation, the storage device controller 12 encodes the data on line 16 from the host 10 and writes the encoded data onto line 18 to the data storage device 14. When data is read, it is received by the storage device controller 12 from the data storage device 14 along line 18, and the storage device controller 12 decodes the data and transmits the decoded data to the host 10.

Although the data storage device 14 may be any type of memory device, the data storage device preferably comprises magnetoresistive random access memory (MRAM) device or other solid state device such as Flash, OVM, a ferro-electric device or a magnetic media storage device such as a tape or disk drive. The data storage device 14 and the storage device controller 12 may be packaged together as a memory component having storage and controlling capacities. The memory component can comprise a memory card that may be removed from the computer system. Such removable memory components have been recently developed to provide a small, compact package, which could be easily carried and stored by a user. The memory component is preferably a type of storage unit that would be compatible with a CompactFlash™ format. However, the storage unit may be of the type that is compatible with other formats, such as SecureDigital™ or MultiMediaCards™.

Figure 4:
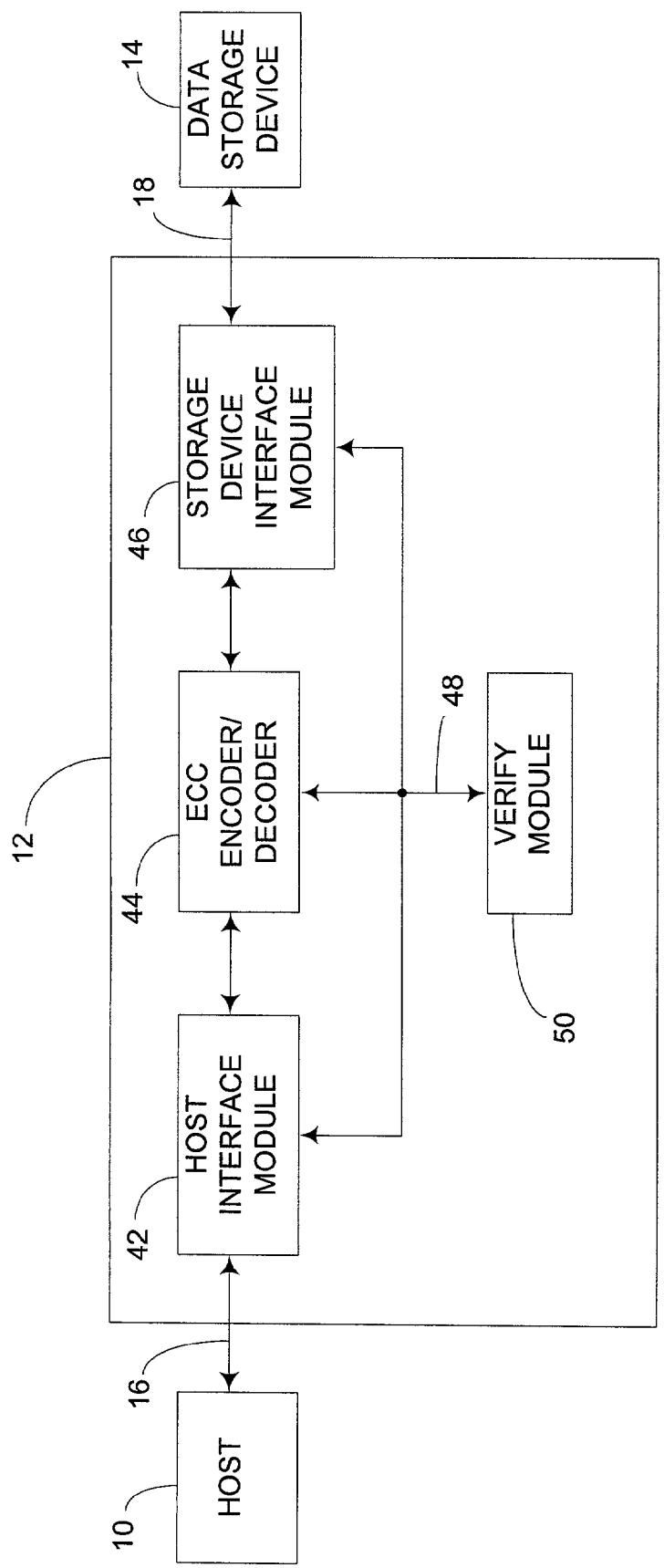
FIG. 4 is a block diagram illustrating details of an embodiment of the storage device controller shown in FIG. 1.

The storage device controller 12 may be configured in a variety of ways to perform the functions of the present invention. For instance, the storage device controller 12 may be configured as shown in FIG. 4. The data path, along which data is transferred, includes the host 10 on one end and the data storage device 14 on the other. Between the host 10 and data storage device 14 are a host interface module 42, an error correcting code (ECC) encoder/decoder 44, and a storage device interface module 46.

Figure 5:
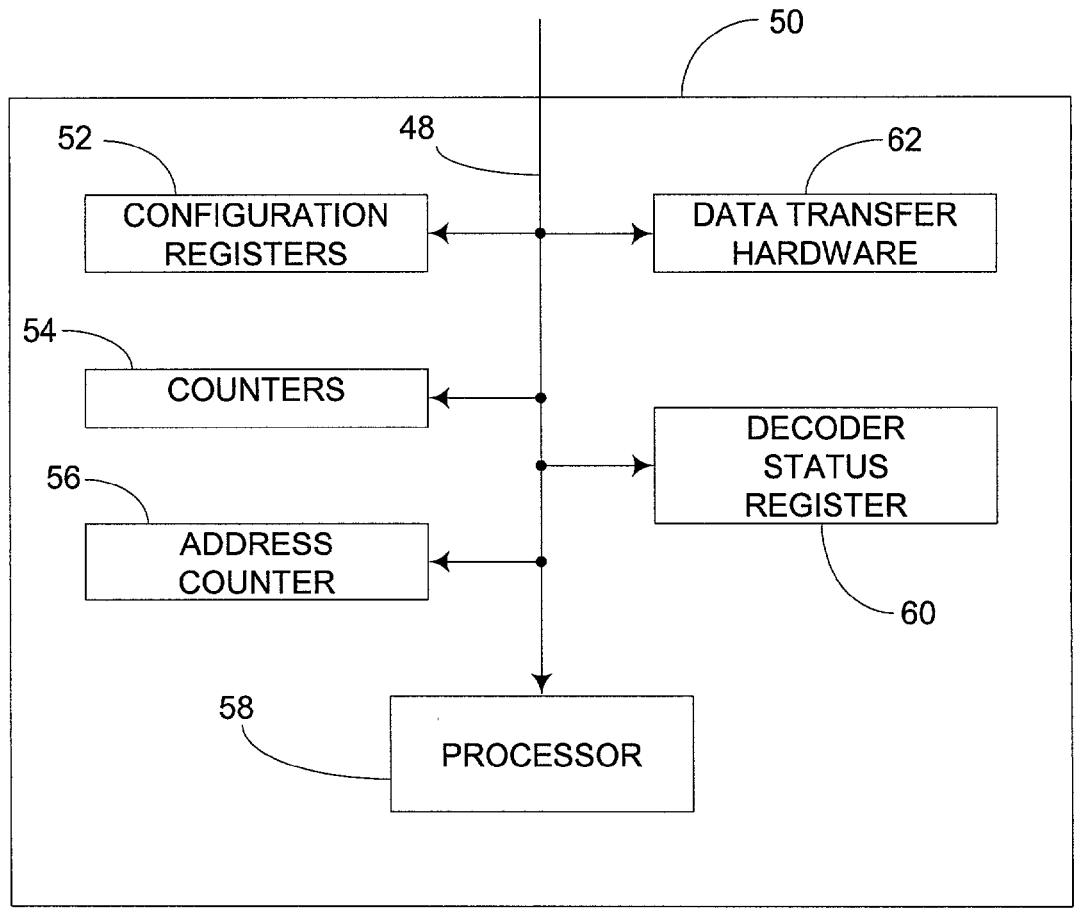
FIG. 5 is a block diagram illustrating details of an embodiment of the verify module shown in FIG. 4.

The host 10 sends commands to the host interface module 42, which stores the commands in its registers. The arrival of a command triggers an interrupt of a processor 58 of a verify module 50. The verify module 50 includes the circuitry as shown in FIG. 5, but may also be configured in other ways. In addition, the verify module 50 may perform functions other than a Verify procedure, such as a Read command or other commands.

The processor 58 reads the registers in the host interface module 42 to recover the command. When the verify module 50 receives an instruction to perform a Verify procedure, appropriate set-up measures are taken to configure the ECC encoder/decoder 44 to perform the procedure.

The status of the registers in the host interface module 42, ECC encoder/decoder 44, and storage device interface module 46 is transmitted to the verify module 50 for analysis. The verify module 50 typically configures the ECC encoder/decoder 44 to run indefinitely. Once the configuration of the ECC encoder/decoder 44 is complete, the verify module 50 triggers the hardware of the ECC encoder/decoder 44 to start the Verify procedure of the present invention. Then, the verify module 50 waits for an interrupt from the ECC encoder/decoder 44 that indicates an error has occurred or for an external event to terminate the test. Also, the verify module 50 collects information regarding the results of the Verify procedure and does not interfere with the operation of the ECC encoder/decoder 44.

The ECC encoder/decoder 44 is coupled to the host 10 through the host interface module 42 such that the ECC encoder/decoder 44 can receive data to be written to memory. The ECC encoder/decoder 44 encodes the data with parity and writes the encoded data to the data storage device 14 via storage device interface module 46.

When a request is made from the host 10 for data in the data storage device 14, the data is transmitted along line 18 to the storage device interface module 46, which then transmits the data to the ECC encoder/decoder 44. The ECC encoder/decoder 44 decodes the data by removing parity stored along with the data and transmits the data to the host 10 via host interface module 42.

Reference is now made to FIG. 5, illustrating the circuitry of the verify module 50. The processor 58 may be provided to control the internal operations of the verify module 50. The involvement of the processor in a system executing a verify command can vary dramatically. In the embodiment shown in FIG. 5, the processor 58 waits for a request to perform the Verify procedure. Upon receipt of such a request, the processor 58 sets the configuration registers 52 for configuring the ECC encoder/decoder 44, such that the ECC encoder/decoder 44 will be capable of performing automatic and continuous verification of data flowing along the data path. The processor 58 may also reset the counters 54 at the beginning of the present Verify procedure. The counters 54 may be used to count numerical results of the Verify procedure, as will be explained in more detail below. Furthermore, the processor 58 may reset the address counter 56 to the first address at the beginning of the data storage device 14, as performed in one method for performing the Verify procedure of FIG. 3, as described below. If a specific start address is requested, the processor 58 sets the address counter 56 to the requested address, as will be described in reference to FIG. 2.

After the configuration registers 52 are set and the counter 54 and address counter are reset, the processor 58 sends a start signal to initiate the Verify procedure. During or after the Verify procedure, the processor 58 interrogates the counters 54 to determine statistical information derived from the Verify test. Also, other information regarding the Verify test may be stored in the decoder status register 60 and interrogated by the processor 58.

Where performance is not a requirement, a processor with suitable input/output (I/O) connections and memory could implement the entire controller application specific integrated circuit (ASIC). In such systems, the processor replaces the ECC encoder/decoder 44 and performs all the functions of the ECC encoder/decoder. In a read operation, the processor uses some I/O lines to implement the protocol to communicate with the data storage device 14 to store data in memory and uses a firmware algorithm to detect and correct errors. Then, the processor uses other I/O lines to implement the protocol to communicate with the host 10 and send the data out. However, this type of system typically requires constant involvement of the processor, which slows down the operation of the test.

In order to maximize performance and to increase the speed of the Verify operation, the involvement of the processor 58 is minimized by taking the processor 58 out of the data path. Therefore, the role of the processor 58 is to accept commands from the host 10, configure the ECC encoder/decoder 44 to execute the commands, and to respond to errors by reporting on the status of the Verify procedure. Since the actual data transfer operation does not involve the processor 58 but is instead automated by hardware which controls the data path and the ECC encoder/decoder 44, the Verify procedure runs more quickly.

The host interface module 42 interrupts the processor 58 to indicate that a command has been received from the host 10 to prompt the processor 58 to perform any of a number of possible functions, i.e. writing, reading, conventional verification, or the verification described herein. In normal operation, read and write functions may be requested by the host 10 that may comprise a manufacturing test system or a system capable of executing self-tests or diagnostics requesting that the device execute a Verify procedure. The configuration registers 52, programmed by the processor 58 in response to a command received from the host 10, control the hardware in the ECC encoder/decoder 44 to automate the execution of the command.

Figure 2:
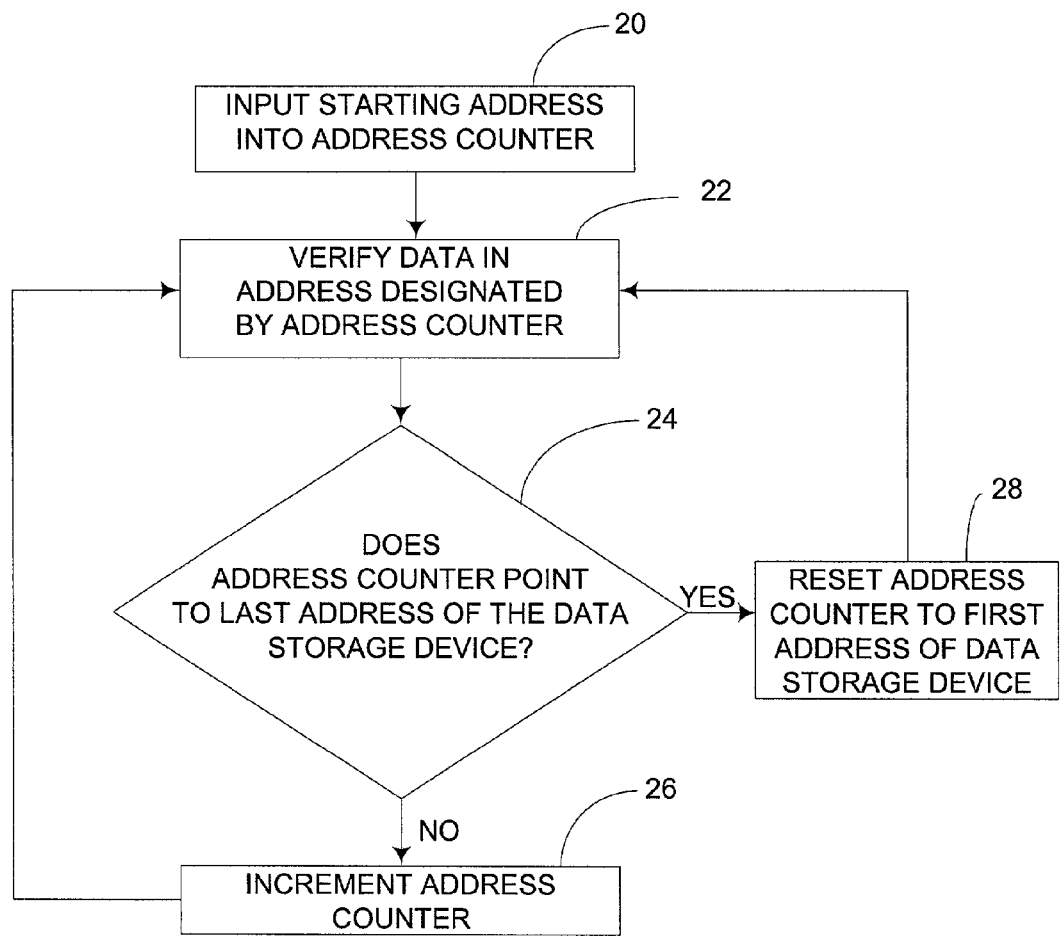
FIG. 2 is a flow chart illustrating functionality of an embodiment of a Verify system of the present invention.
Figure 6:
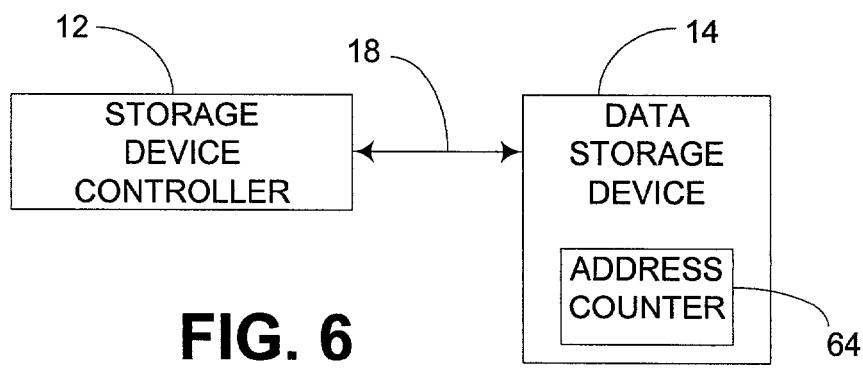
FIG. 6 is a block diagram illustrating an alternative embodiment of the data storage device shown in FIG. 1.

FIG. 2 shows a flow chart that illustrates one way in which the storage device controller 12 may be implemented to perform a Verify procedure. Beginning with step 20, a starting address is input into an address counter. The address counter may be included as part of the verify module 50 as shown in FIG. 5 by reference numeral 56 or may be included in the data storage device 14 itself as shown in FIG. 6 by reference numeral 64. Either embodiment, or other possible configurations, may be utilized wherein an address counter is accessible to the system.

After a starting address is input into the address counter, as indicated in step 20, the data which is located in the address designated by the address counter is read out of the data storage device 14 and processed by the storage device controller 12, where the ECC encoder/decoder 44 verifies the data in the particular address location by determining if an error exists in the data, as indicated in step 22. If the ECC encoder/decoder 44 detects an error, the processor 58 is interrupted. Alternatively, the processor may be interrupted in response to a certain number of different types of errors as suggested in the co-pending application Ser. No. 10/091738 (HP docket no. 10018462-1), hereby incorporated by reference in its entirety herein. In some embodiments, the processor 58 may interrogate the data transfer hardware 62 to determine the cause of the error and may accumulate statistics noting the error and the address where it occurred. Then the processor 58 resumes the test.

In some embodiments, the data transfer hardware 62 can automatically collect data without interrupting the processor 58 when an error is detected in order to speed the execution of the test and the collection of data. In an alternative embodiment a counter 54 connected to the ECC encoder/decoder 44 may be incremented each time the ECC encoder/decoder 44 corrects a correctable error.

After the data is verified in step 22, the processor 58 determines, from the address counter 56, 64, whether the address counter 56, 64 has reached the last address at the end of the data storage device 14 (step 24). If, on the other hand, the end has not yet been reached, then the address counter 56, 64 is incremented (step 26). If the end has indeed been reached, then the address counter 56, 64 is reset to the first address at the beginning of the data storage device (step 28). After the address counter 56, 64 has incremented or reset, then verification at that address is again performed by the ECC encoder/decoder 44. The steps of the Verify procedure then continue indefinitely in an infinite loop. Optionally, the processor 58 may terminate the Verify procedure after a certain number of passes through all of the addresses. In such a case, a counter 54 may count the number of passes, and the processor 58, in response to a predetermined number in the counter 54, may terminate the procedure. Alternatively, the procedure may be terminated after an error is detected.

Figure 3:
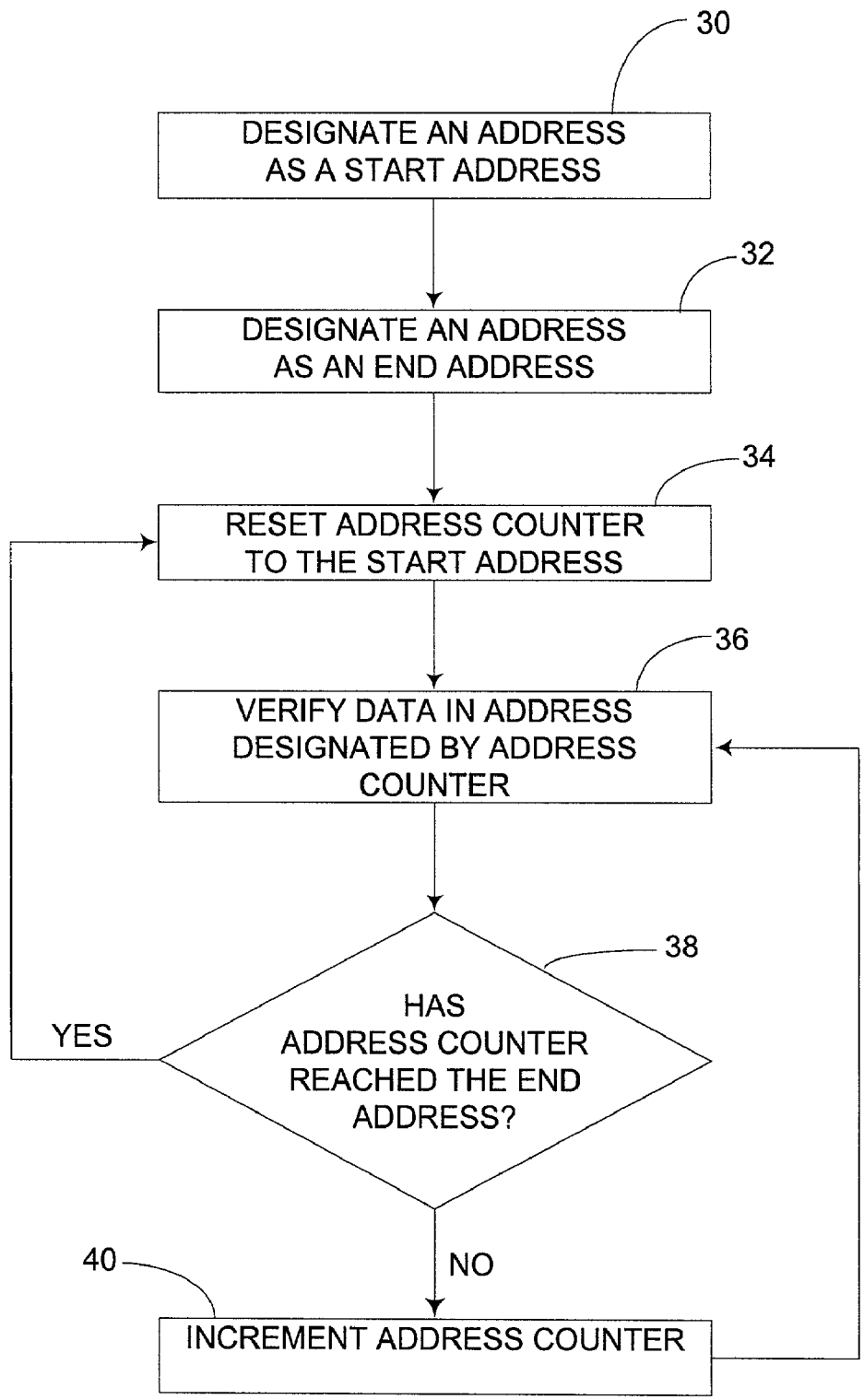
FIG. 3 is a flow chart illustrating alternative functionality of an embodiment of a Verify system of the present invention.

FIG. 3 illustrates another method for accomplishing the Verify procedure of the present invention. As shown in FIG. 3, the procedure begins with step 30 at which an address is designated as a starting address. The starting address may be the first address at the beginning location of the data storage device 14 or may be any arbitrary address. Once selected, the designated start address may be the starting position for all subsequent passes.

Next, as indicated in step 32, an address is designated as the end address. The end address may be the last address at the end of the storage device 14 or may be any arbitrary address. Preferably, the end address is greater than the start address designated in step 30, so that any incrementing of the address counter 56, 64 eventually lead to an end limit designated by the end address. Alternatively, the end address may be designated by a lower address than the start address provided that the address counter 56, 64 is configured to count backwards.

As mentioned above, the start and end addresses may be designated at the very first and last addresses of the storage device, such that each Verify pass will test every address in the media from beginning to end. Alternatively, a range of addresses can be designated so that only a portion of the media is tested. In such a case, any arbitrary address range may be selected. In one example, the range of addresses physically located at the outer edge of a disk drive may have different properties from the properties of addresses closer to the middle of the disk drive. In such a situation, it may be desirable to perform a continuous verification procedure on a designated range of addresses located at a physical portion of the media. It may also be desirable to perform the Verify procedure of the present invention on any specific range of addresses based on other factors which may be characteristic of certain portions of the media.

In step 34, the address counter 56, 64 is reset to the start limit. Then, in step 36, the data located in the address identified by the address counter 56, 64 is read by the controller 12 and verified. Then, it is determined whether or not the address counter has reached the end limit (step 38). If not, the address counter 56, 64 increments to the next address (step 40), and verification at the next address is conducted (step 36). If the address counter 56, 64 has reached the end limit in step 38, then the address counter 56, 64 is reset to the start limit (step 34) and the Verify procedure continues to the next pass of all of the data in the storage device.

As in the method described with reference to FIG. 2, the method of FIG. 3 also provides a procedure that continues indefinitely or until an external event causes termination of the procedure or until an error is detected. When an error is detected, the verification step 36 may divert to an interrupt procedure for servicing the error.

As illustrated in FIG. 5, the verify module 50 may include counters 54. Although only one block is used to show the counters 54, any number of counters may be used in parallel and connected to the bus 48 for detecting any number of countable parameters during the Verify procedure described herein. The counters 54 may be used to record statistical data on the results of the Verify procedure in order to determine the quality of the media used in the data storage device 14. For example, a counter could be used for counting the number of passes of all the address locations that the Verify procedure has run through.

Another counter can be used to figure out how often an error is detected in a defective location. As is known in the art, errors may not show up on every pass. For instance, random errors may only be detected during one pass and not be detected in subsequent passes. A benefit of using the counter 54 in the above-described Verify procedure is to detect the memory locations that do not reveal problems during a conventional one-pass Verify command, but which reveal problems after a number of passes, or even long after the product has been manufactured. Another counter can be used to determine how much of the media has been checked before an error has been detected. Such a counter could be used to determine the quality of the media.

Still other counters can be used over a long period of time during periodic verification procedures to detect degradation problems in the storage media. By running the Verify procedure periodically during the course of a certain length of time, deterioration of the media over time could be detected.

Other counters can be used in a development environment to determine whether one media has better success in recovering data than another media. By counting errors of one media over several passes through the data, the results can be compared with the results of another media. The comparison may be performed by the processor 44 using results stored in memory 54.

Persons having ordinary skill in the art will appreciate that other counters can be provided for gathering useful data on the detecting and correcting of errors in the data storage media. The counters could be used in conjunction with other statistical gathering devices for collecting, analyzing, and processing statistics on various types of media.

With respect to the processor 58, additional features such as memory may be included in combination with the processor 58. Memory in the processor 58 may store reference values that indicate the minimum quality standards of media under test. In such a case, the processor 58 could compare the reference values with the results of the media under test to determine if the media meets certain standards. The memory in the processor 58 may alternatively be used to store data on the data storage device 14 for use by other processing devices. Also, the memory may store a spare table including a list of all the locations within the storage media that contain unrecoverable errors. The memory in processor 58 can store the alternative memory locations so that any reference to a particular address location containing an unrecoverable error will be diverted to the alternative memory location. In addition, the memory may be used to store program steps for instructing the processor 44 how to perform the Verify procedure of the present invention.

The Verify procedure described herein may be implemented in hardware, software, firmware, or a combination thereof. In some embodiments, the Verify procedure may be implemented in software or firmware that is stored in memory and that is executed by a suitable instruction execution system using, for instance, processor 58. If implemented in hardware, as in an alternative embodiment, the Verify procedure can be implemented with any of a combination of the following technologies, which are all well known in the art: discrete logic circuits having logic gates for implementing logic functions upon data signals, ASICs having appropriate combinational logic gates, programmable gate arrays (PGAs), field programmable gate array (FPGAs), etc.

The flow charts of FIGS. 2 and 3 show the architecture, functionality, and operation of a possible implementation of the software. In this regard, each block represents a module, segment, or portion of code, which comprises one or more executable instructions for implementing the specified logical function(s). It should also be noted that in some alternative implementations, the functions noted in the blocks may occur out of the order shown in FIGS. 2 and 3. For example, the two steps 30 and 32 in FIG. 3, shown in succession, may in fact be executed substantially concurrently or the blocks may sometimes be executed in the reverse order, depending upon the functionality involved, as will be obvious to one of ordinary skill in the art.

The Verify procedure of the present invention, which may comprise an ordered listing of executable instructions for implementing logical functions, may be embodied in any computer-readable medium for use by or in connection with an instruction execution system, apparatus, or device, such as a computer-based system, processor-containing system, or other system that can retrieve the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In the methods described herein, not only is error correction performed after a single Write command, but error detection and correction can be performed repeatedly for an indefinite time to detect errors and to accumulate information about the quality of the storage media.

By using the systems described herein, sparing techniques can be used even after manufacturing. For instance, the storage device controller 12 may add new defective memory locations to a spare table when the media of the data storage device 14 degrades over time. A spare table, containing a list of defective memory address locations and a list of alternative address locations, may be stored in memory located in the processor 58 and accessed by the processor 58. Therefore, the user's data will not be lost when the media wears out after an extended time.

Errors detected over time can be an indication that the media is defective. A comparison among other types of media can be made to discover what type of media holds up better over time.

Also, detected errors may be the result of harsh environmental conditions such as extreme temperatures or a humid environment. Therefore, the Verify procedure described above is capable of providing information about how the media stands up to these or other harsh conditions.

Also, the controller may also indicate how a particular storage media reacts to other external conditions that may cause damage to a storage device. Shock from a storage device being dropped on a hard surface may cause damage that can be detected by continuous error checking.

Unlike the conventional Verify command, which merely runs a fixed address length after a Write command occurs, the Verify procedure disclosed herein runs until it sees an error or until it is stopped by an external event. Otherwise, the Verify procedure runs indefinitely. For this reason, the verifying systems described above do not have the overhead required by conventional systems where a controller is needed to start the verify function and stop the function at the end of a designated address length, during which time the operation of other programs must wait for the verify interrupt to end until proceeding with other useful procedures.

The present disclosure provides a more efficient scheme for testing media by requiring less overhead, wherein there are no start and stop routines which take up time as the controller's processor must wait for the interrupt to finish its routine. The controller of the present invention is only involved when an error occurs and is detected, and it runs parallel to other processors while they proceed with normal operation.

We claim:

1. A system for verifying data in a data storage device, the data storage device storing data in a number of accessible address locations, said system comprising:
   means for designating a range of addresses from said number of accessible address locations as addresses to be verified;
   means for verifying whether or not data stored in a starting address of said addresses to be verified contains an error;
   means for incrementing the verified address;
   means for determining whether or not the incremented address is at the end of the range of addresses to be verified;
   means for changing the address to the next address when said means for determining has determined that the incremented address is not at the end of the range of addresses to be verified;
   means for resetting the address to an address at the start of the range of addresses to be verified when said means for determining has determined that the address is at the end of the range of addresses to be verified such that all addresses within the range can be re-verified in a continuous loop;
   means for interrupting the verifying upon detecting an error in data of one of the addresses; and
   means for resuming the continuous loop.

2. The system of claim 1, further comprising means for counting the number of errors detected by said means for verifying.

3. The system of claim 1, further comprising means for storing output results from said means for verifying.

4. A computer-readable medium containing computer-readable instructions which are executable to:
   input a starting address and an ending address so as to define a range of addresses to be verified;
   verify whether or not data stored at an address in the range contains an error;
   determine whether or not the verified address is the ending address;
   initiate verification of the first address if the verified address is the ending address such that all addresses within the range can be re-verified in a continuous loop;
   interrupt the verifying upon detecting an error in data of one of the addresses: and resume the continuous loop.

5. The computer-readable medium of claim 4, wherein verifying comprises repeatedly verifying until an error is detected.

6. The computer-readable medium of claim 4, further comprising instructions executable to initiate an interrupt upon detection of an error by said logic configured to verify, wherein initiating an interrupt comprises correcting the data detected in the error.

7. A computer-implemented method for verifying data stored in a data storage device, comprising:
   sequentially verifying whether or not data stored at multiple addresses within a range of addresses defined by a starting address and an ending address contains an error;
   continuously repeating the sequential verifying of the multiple addresses within the range in a continuous loop such that the verifying can continue indefinitely;
   interrupting the sequential verifying upon detecting an error in data of one of the multiple addresses; and
   resuming the continuous repeating of the sequential verifying.

8. The method of claim 7, wherein verifying comprises verifying the addresses using an error code correction (ECC) encoder/decoder.

9. The method of claim 7, wherein verifying the addresses using an error code correction (ECC) encoder/decoder comprises writing encoded data that is stored at the addresses, reading the stored encoded data from the addresses, decoding the encoded data, and identifying any errors in the data.

10. The method of claim 9, further comprising correcting any errors in the data.

11. The method of claim 7, wherein the range of addresses comprises a subset of all of the addresses of the data storage device.

12. The method of claim 7, wherein the range of addresses comprises all of the addresses of the data storage device.

13. The method of claim 7, further comprising collecting data regarding errors in data stored at one or more of the multiple addresses without interrupting the sequential verifying.

14. The method of claim 7, further comprising terminating the sequential verifying upon an external error occurring.

15. The method of claim 7, further comprising terminating the sequential verifying upon completion of verifying each address in the range a predetermined number of times.

16. The method of claim 7, further comprising receiving designation of the start address and the end address.

17. A memory component, comprising:
a data storage device that includes a plurality of addresses; and
a storage device controller that includes an error correction code (ECC) encoder/decoder and a verify module, the verify module comprising a processor that controls the ECC encoder/decoder to sequentially verify whether or not data stored at addresses of the data storage devices within a range defined by a starting address and an ending address contains an error, to continuously repeat the sequential verifying of the multiple addresses within the range in a continuous loop such that the verifying can continue indefinitely, to interupt the sequential verifying upon detecting an error in data of one of the and to resume the continuous repeating of the sequential verifying.

18. The memory component of claim 17, wherein the data storage device is a solid state storage device.

19. The memory component of claim 17, wherein the data storage device is a magnetic storage device.

20. The memory component of claim 17, wherein the ECC encoder/decoder is configured to write encoded data that is stored at the addresses, read the stored encoded data from the addresses, decode the encoded data, and identify any errors in the, data.

21. The memory component of claim 20, wherein the ECC encoder/decoder is further configured to correct any errors in the data.

22. The memory component of claim 17, wherein the verify module further comprises an address counter that stores the starting address.

23. The memory component of claim 17, wherein the verify module further comprises at least one counter that stores at least one of an indication of the number of times each address within the range is to be verified and the number of data errors that are detected.

24. The memory component of claim 17, wherein the verify module further comprises a configuration register that stores data used to configure the ECC encoder/decoder.

25. The memory component of claim 17, wherein the verify module further comprises data transfer hardware that automatically collects data about detected errors without interrupting the processor.

26. The memory component of claim 17, wherein the range of addresses comprises a subset of all of the addresses of the data storage device.

27. The memory component of claim 17, wherein the range of addresses comprises all of the addresses of the data storage device.

* * * * *